United States Patent
Cheung et al.

(10) Patent No.: US 9,420,801 B2
(45) Date of Patent: Aug. 23, 2016

(54) FOOD KNEADING APPLIANCE WITH A DOUGH HOOK AND DOUGH MIXER

(71) Applicant: Huiyang Allan Plastic & Electric Industries Co., Limited, Guangdong Province (CN)

(72) Inventors: Shu Sang Cheung, Guangdong Province (CN); To Yin Pang, Guangdong Province (CN)

(*) Notice: Subject to any disclaimer, the term of this patent is extended or adjusted under 35 U.S.C. 154(b) by 531 days.

(21) Appl. No.: 13/898,488

(22) Filed: May 21, 2013

(65) Prior Publication Data

US 2014/0219045 A1    Aug. 7, 2014

(30) Foreign Application Priority Data

Feb. 5, 2013 (CN) .................... 2013 2 0065741 U

(51) Int. Cl.
| | |
|---|---|
| A47J 43/08 | (2006.01) |
| A21C 1/14 | (2006.01) |
| A21C 1/02 | (2006.01) |
| B01F 7/16 | (2006.01) |
| A47J 43/07 | (2006.01) |
| B01F 7/00 | (2006.01) |

(52) U.S. Cl.
CPC .............. *A21C 1/1405* (2013.01); *A21C 1/02* (2013.01); *A21C 1/1465* (2013.01); *A47J 43/0722* (2013.01); *A47J 43/085* (2013.01); *B01F 7/00325* (2013.01); *B01F 7/166* (2013.01)

(58) Field of Classification Search
CPC . A47J 43/085; A47J 43/0722; B01F 7/00325; B01F 7/166; A21C 1/02; A21C 1/1405; A21C 1/1465

USPC .............. 366/97, 100, 293–296, 288
See application file for complete search history.

(56) References Cited

U.S. PATENT DOCUMENTS

| | | | | | |
|---|---|---|---|---|---|
| 1,555,043 | A | * | 9/1925 | Wagner | B64D 35/04 416/129 |
| 1,692,022 | A | * | 11/1928 | Babitzky | A23G 3/0215 366/149 |
| 3,054,565 | A | * | 9/1962 | Willems | A21C 1/02 241/162 |
| 3,176,968 | A | * | 4/1965 | Appleton | A47J 27/004 219/433 |

(Continued)

FOREIGN PATENT DOCUMENTS

| | | | | |
|---|---|---|---|---|
| EP | 2762004 | A3 * | 10/2014 | ............ A47J 43/085 |
| GB | 686771 | A * | 1/1953 | ............ A47J 43/046 |

*Primary Examiner* — Charles Cooley
(74) *Attorney, Agent, or Firm* — Prakash Nama; Global IP Services, PLLC

(57) ABSTRACT

A food kneading appliance especially adapted to mix and knead bread or pizza dough or dough of other types includes a container, a central body located in the center of the container, kneading tools, and a drive unit to rotate the central body. The central body includes a stirring spindle and a kneading spindle which are positioned in the same axis and rotate in opposite directions in operation. The kneading tools include a dough hook disposed on the stirring spindle and a dough mixer disposed on the kneading spindle. The appliance can provide large torque and low speed operation so that the dough can be processed without overheating and deteriorating. Beyond that, the dough is easy to be thoroughly mixed and achieve high quality dough that is comparable to manual kneading. Another advantage of the invention is that the kneading process is stable and low in noise.

8 Claims, 4 Drawing Sheets

(56) References Cited

U.S. PATENT DOCUMENTS

| | | | | |
|---|---|---|---|---|
| 4,049,243 A | * | 9/1977 | Kramer | A47J 36/165 366/248 |
| 4,155,656 A | * | 5/1979 | Kramer | A47J 36/165 366/248 |
| 5,483,848 A | * | 1/1996 | Rebordosa | A47J 43/085 74/355 |
| 9,179,802 B2 | * | 11/2015 | Cadorin | A47J 43/085 |
| 2013/0033958 A1 | * | 2/2013 | Bravo | B01F 7/00208 366/272 |
| 2014/0219045 A1 | * | 8/2014 | Cheung | A47J 43/085 366/97 |
| 2015/0230480 A1 | * | 8/2015 | Wang | A21C 1/1405 366/97 |

* cited by examiner

FOOD KNEADING APPLIANCE WITH A DOUGH HOOK AND DOUGH MIXER

BACKGROUND OF THE INVENTION

The present invention relates to improvement of a food kneading dough appliance.

Nowadays, food processors sold in various markets, have the multi functions of stirring, cutting, slicing, mixing, kneading, etc. The kneading tool is rotated by drive device, for mixing and kneading the flour with the water in a container into a dough, replacing traditional manual kneading method which can be tiring and unpleasant. For example, Chinese patent application whose published NO. is CN102056526A discloses a kneading tool including one stirring arm and at least one axially and radially extended wiper. Due to the rotation, the stirring arm and the wiper make mixing and kneading force to the ingredients resulting in a properly kneaded dough. During operating, the dough will be moved following the dough hook, by unbalanced force with single dough hook, severe vibration and sway will occur so that the dough cannot be kneaded well. In addition, for settling the defect it can't make the dough in low speed, such kneading devices are set in high speed rotation that creates noise and can make the dough overheat and deteriorate. The resulting dough can be worse than kneading by hand. There is one type of kneading appliances whose central body configure two stirring arms which are different or same shape on its top or bottom, and for increasing the effect of clashing and beating on the dough, it's provided with a lot of ribs on the wall of the container or central body. Though the ribs structure increases the effect of kneading by increasing contact area between dough and dough hook, the edges and ridges make cleaning cumbersome.

BRIEF SUMMARY OF THE INVENTION

An object of the present invention is to settle shortages of the existing technology, to provide a food kneading appliance which can operate under lower rotation speed and has at least a similar performance as manual dough kneading.

The food kneading appliance includes a container, a central body located on the center of the container, at least two kneading tools located on the central body, and a drive unit for driving the central body. The central body comprises a stirring spindle and a kneading spindle configured on the stirring spindle. The stirring spindle and the kneading spindle are located in the same axis and rotating in opposite directions in operation. The kneading tools comprise a dough hook disposed on the stirring spindle and a dough mixer disposed on the kneading spindle.

Preferably, the kneading spindle is located on the upper portion of the stirring spindle.

Preferably, the drive unit comprises a drive shaft for driving the stirring spindle, and a motor for driving the drive shaft; a driving bevel gear is located on the upper inner side of the stirring spindle; the kneading spindle further comprises an upper kneading spindle having a following bevel gear located inside of lower portion and a lower kneading spindle is provided with several gear brackets, several planet bevel gears is received in the gear brackets and can rotate freely in the gear brackets; the driving bevel gear drives the following bevel gear rotating in counter direction via the planet bevel gears.

Preferably, a hollow cylindrical object with both ends open is projected out from the center of the bottom of the container; the central body is detachably mounted on the outside of the cylindrical object, the drive shaft connects to the central body though the center of the cylindrical object.

Preferably, the container further comprises a cover, the cover comprises a feeding passage.

Preferably, the cylindrical object and the container are molded in one.

Preferably, the dough hook is substantially J shaped, one end of the dough hook extends downwardly from a lower side of the stirring spindle, and then extends upwardly after bending angularly; a substantially inverted L-shape kneading arm is mounted on the outside of the upper kneading spindle; the dough mixer is connected to the free end of the kneading arm and is formed as paddle shape.

Preferably, the dough hook protrudes substantially horizontally from the lower part of the stirring spindle and extends upward after bending angularly, the dough mixer is configured outside of the upper kneading spindle and is substantially formed as L-shape.

Comparing with the conventional kneading device, the invention has the following advantages:

(1) The dough is easy to be mixed well, and the food kneading appliance has at least a similar performance as manual dough kneading. The invention can provide large torque and low speed operation so that the dough processed will not be overheated and deteriorating, and there is low noise in running. Meanwhile, the case of severe vibration and sway will be avoided due to balance force of counter rotating between two kneading tools, the bearing capacity of kneading in one round is strong, with stable function and being clever to drive various of kneading tools.

(2) The invention of simple structure, easy to clean and low cost on production, it is suitable for mass production.

(3) Dough temperature remains cool due to low speed kneading.

(4) The present invention can operate for a long duration (e.g. 30 mins).

DETAILED DESCRIPTION OF THE INVENTION

Figure 1:
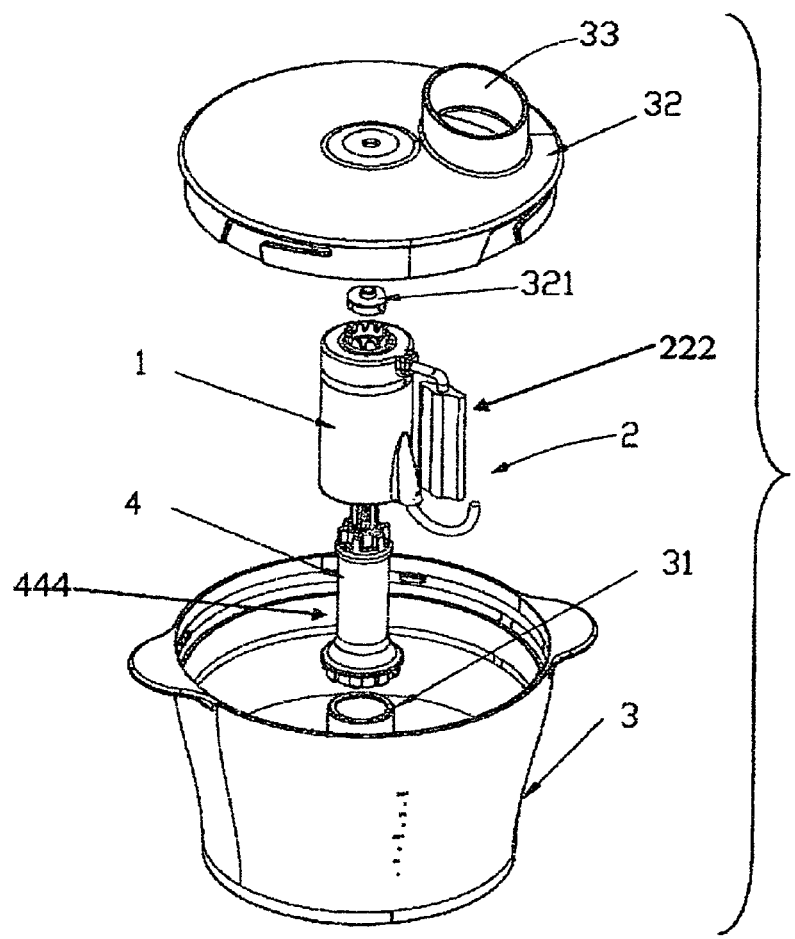
FIG. 1 is an exploded view of a food kneading appliance in according to a first embodiment of the present invention.

Embodiments of the present invention will be described in detail below, with reference to the accompanying drawings.

Embodiment I

Referring to FIG.1 to FIG.4, a food kneading appliance includes a container 3, a central body 1 located on the center of the container 3, at least two kneading tools 2. 222 located on the central body 1, and a drive unit 444 for driving the central body 1.

The central body 1 includes a stirring spindle 11 and a kneading spindle 12 which is configured on the stirring spindle 11. The stirring spindle 11 and the kneading spindle 12 are located in the same axis and rotating in opposite directions in operation.

The first kneading tool 2 includes a dough hook 21 disposed on the stirring spindle 11 and the second kneading tool 222 includes a dough mixer 23 disposed on the kneading spindle 12. In the embodiment, the dough hook 21 is substantially J shaped, one end of the dough hook 21 extends downwardly from a lower side of the stirring spindle 11, and then extends upwardly after bending angularly. A substantially inverted L- shape kneading arm 22 is mounted on the outside of the upper kneading spindle 14. The dough mixer 23 is connected to the free end of the kneading arm 22 and is formed as paddle shape. In other embodiments, the dough hook 21 can protrude substantially horizontally from the lower part of the stirring spindle 11 and extends upwardly after bending angularly.

The drive unit includes a drive shaft 4 for driving the stirring spindle 11, and a motor for driving the drive shaft 4. A hollow cylindrical object 31 with both ends open is projected upward from the center of the bottom of the container 3. Preferably, the cylindrical object 31 and the container 3 are molded in one. The central body 1 detachably sleeved on the outside of the cylindrical object 31. The drive shaft 4 connects to the stirring spindle 11 though the center of the cylindrical object 31.

A driving bevel gear 111 is located on the upper inner side of the stirring spindle 11 and rotates along with the drive shaft 4 in operation.

The kneading spindle 12 includes a lower kneading spindle 13 with an end connected to the stirring spindle 11, an upper kneading spindle 14, and a connector 15 connected to the other end of the lower kneading spindle 13 via a through hole 144 defined in the center of the upper kneading spindle 14. The lower kneading spindle 13 defines several gear brackets 131. Several planet bevel gears 132 are received in the corresponding gear brackets, and can rotate freely in the gear brackets 131. The upper kneading spindle 14 has a following bevel gear 141 located inside of the lower portion. The driving bevel gear 111 drives the following bevel gear 141 rotating in counter direction via the planet bevel gears 132. That is the dough hook 21 and the dough mixer 23 also rotate in opposite direction. Preferably, the dough hook 21 and the dough mixer 23 rotate in different circles.

The container 3 includes a cover 32 and the cover includes a feeding passage 33. Through the through hole defined in the center of the upper kneading spindle 14, the lower kneading spindle 13 is connected with the connector 15 by screw joints which are respectively set in the lower inside part of the connector 15 and in the upper outside part of the lower kneading spindle 13, a locker groove on the connector 15 is used to lock a holder 321 which is fixedly connected to the cover 32.

Figure 2:
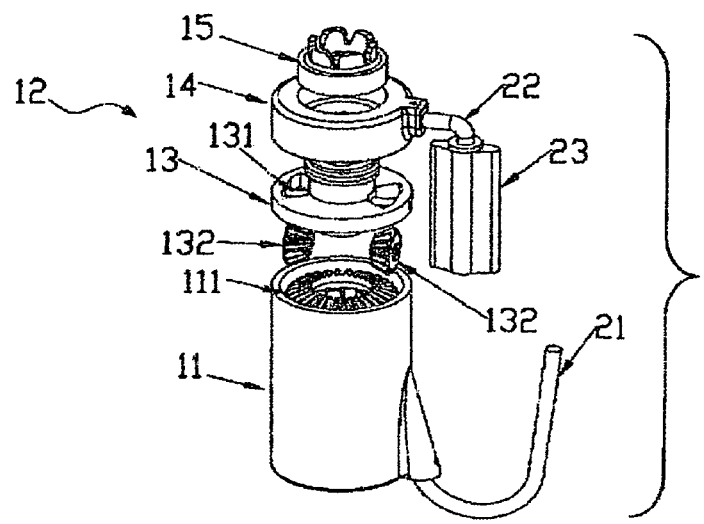
FIG. 2 is an exploded view of the central body and the kneading tools of FIG. 1.
Figure 3:
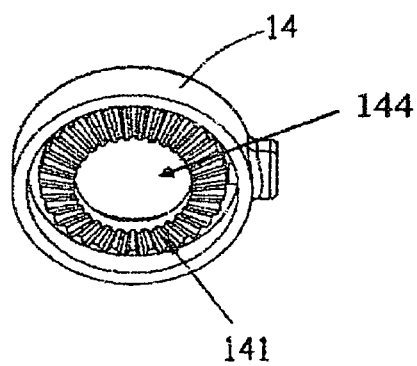
FIG. 3 is a plan view of the upper kneading spindle of FIG. 2.
Figure 4:
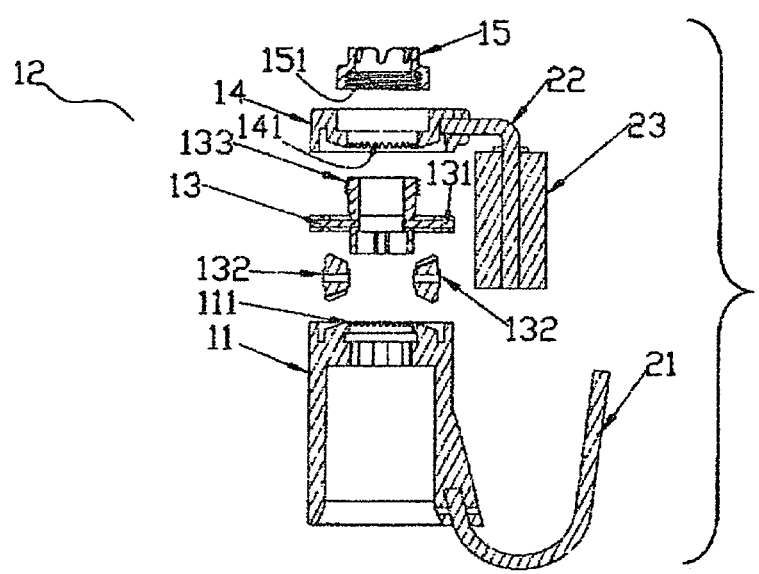
FIG. 4 is a cross-section view of the central body and the kneading tools of FIG. 2.

In above Embodiment I, the kneading spindle 12 includes the lower kneading spindle 13 configured in bottom, and the upper kneading spindle 14 configured in the middle, and the connector 15 configured on top. In the inner walls of both the lower kneading spindle 13 and the stirring spindle 11, having multiple guide rails and corresponding guide grooves which are matching each other for strength the fixation. And depending on the multiple guide rails and guide grooves, the upper portion of the stirring spindle 11 does not shake when it rotates. There are several planet bevel gears 132 fixed on the gear brackets 131 which are configured in the side of the axis of the lower kneading spindle 13, the planet bevel gears 132 are allowed to rotate freely in the gear brackets 131 but can't be moved axially. The several planet bevel gears 132 are engaged between the driving bevel gear 111 and the following bevel gear 141. In working, the driving bevel gear 111 is driven by motor and transmit power to the following bevel gear 141 and to rotate the upper kneading spindle 14 in counter rotation, the lower kneading spindle 13 and the connector 15 will not rotate. The gear unit includes the several planet bevel gears 132, the driving bevel gear 111 and the following bevel gear 141. The kneading arm 22 extends a part horizontally outside the upper kneading spindle 14, and then extending angularly downward, the dough mixer 23 is formed with the kneading arm 22. The angle of the kneading arm 22 bending is 90° in the Embodiment I. In FIG. 2, the dough mixer 23 is designed as paddle shape, it can increase contact area between the dough mixer 23 and dough. Through the center of the upper kneading spindle 14, the lower kneading spindle 13 is connected with the connector 15 by a first screw joint 133 and a second screw joint 151 respectively set in the lower inside part of the connector 15 and in the upper outside part of the lower kneading spindle 13, a locker groove on the connector 15 is used to lock the holder 321.

The stirring spindle 11 is driven by the drive shaft 4 directly, the upper kneading spindle 14 driven by the gear unit are opposite on rotation direction, so that the dough hook 21 and the dough mixer 23 are different in rotation direction, the speed ratio is 1:1. Setting two kneading tools up and down and on counter rotation is to imitate the state of hand-making and to reach hand-making effect. The motor of driven unit is controlled by the control unit to achieve the speed adjusting and the positive and negative rotation. It can be driven directly by motor or indirectly by the gear unit. The Embodiment I is to achieve low speed rotation through speed switch by transmission, to avoid the case of overheat and deterioration in dough and to avoid the noise from severe vibration. The kneading tools formed up and down and rotated in different direction can increase touching times between dough and kneading tools. Comparing that with single dough hook and this with two kneading tools on the same speed, latter relative speed of dough and kneading tool is larger several times than the former, and kneading is better in consistency, gluten development and texture, and be allowed to reach manual kneading effect, meanwhile, the latter can restrain severe vibration and sway due to unbalance by single dough hook. The driving bevel gear 111 is allowed to set more planet bevel gears, so that the bearing capacity will be stronger, and processing more dough in one round.

Embodiment II

Figure 5:
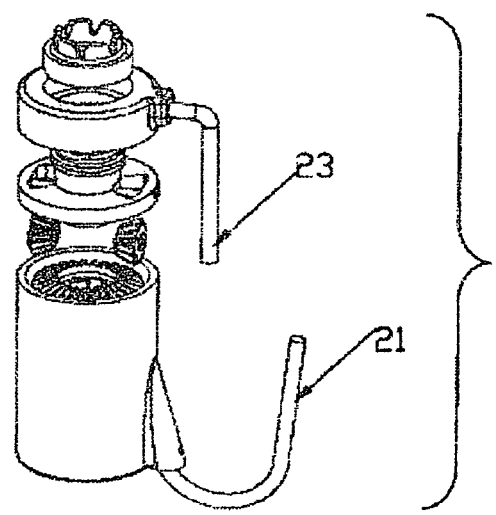
FIG. 5 is an exploded view of a central body and kneading tools in according to a second embodiment of the present invention.
Figure 6:
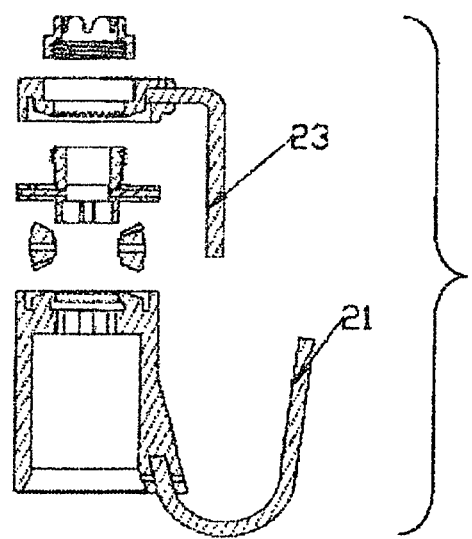
FIG. 6 is a cross-section view of the central body and the kneading tools of FIG. 5.

Referring to FIG. 5 and FIG. 6, Embodiment II is similar to Embodiment I on structure, but be different from the shape of the dough mixer 23 which is L-style, and there is no need to set kneading arm. The L-shape dough mixer's 23 horizontal length and bending and vertical length are allowed to be various on design.

During operation processing, connecting the drive shaft 4 end to the motor, putting the container 3 on the base, then the upper and middle section of the drive shaft 4 protrude through the upper end opening of the hollow cylindrical object 31 of the container 3, the edge of the container's 3 bottom is fixed on the top of the base by locker parts, the central body 1 with kneading tools 2 is held on the hollow cylindrical object 31. Both of guide rails and guide grooves in the drive shaft 4 and the stirring spindle 11 are assembled each other. The drive shaft 4 is held in the connector 15 with the same axis, both of them are locked with the locker which is on the cover 32. The cover 32 locked to the container 3 after rotating, putting proper water and flour in the container 3. When switched on, the drive shaft 4 driven by drive unit and rotate the central body 1 and the kneading tools 2, because of the gear unit, the dough hook 21 and the dough mixer 23 will rotate in different direction, to stir and knead water and flour. In the final phase of processing, the dough begin to be more sticky, the central body 1 takes part in the kneading with the inner wall of the container 3 to squeeze the dough, the dough hook 21 is extending under the dough and cause the dough move. The dough mixer 23 can achieve beat, knead and other manual effect, the kneading tools 2 may be replaced by other structure that realize the similar or the same function. Because of the low running speed and the balance force of opposite rotation, the invention can restrain the noise of appliance's severe vibration effectively, also, the appliance will not sway. After kneading is over and power off, to take the dough away from the container 3. The central body 1 and the kneading tools 2 can be removed from the container and cleaned, both of them can be made of non-sticky metal or plastic in order to facilitate ease of cleaning.

To sum up, the appliance can provide large torque and low speed operation so that the dough can be processed without overheating and deteriorating. Beyond that, the dough is easy to be thoroughly mixed and achieve high quality dough that is comparable to manual kneading. Another advantage of the invention is that the kneading process is stable and low in noise. Vibration and sway will be avoided due to the balancing force of counter-rotation action of the two kneading tools. Furthermore, the utility model has the advantages of strong bearing capacity in a single kneading, with stable function and being clever to drive various of kneading tools, it's easy to be cleaned, to provide simple and reliable structure.

The above statement represents a typical operation of the invention, The invention should not be limited within the scope of the above detailed statement only. It will be appreciated that various modifications may be made to the embodiments described above. To the person skilled in the art, other changes and modifications which are based on this invention could be made, such as to change the number or the shape or the material of the kneading tools. The idea of this invention and the above stated possibilities shall all be protected under this patent application.

What is claimed is:

1. A food kneading appliance for kneading a dough comprising:
    a container,
    a central body located on a center part of the container;
    at least a first kneading tool and a second kneading tool located on the central body; and
    a drive unit for driving the central body;
    wherein the central body comprises a stirring spindle and a kneading spindle configured on the stirring spindle, the stirring spindle and the kneading spindle are located in the same axis and rotating in opposite directions in operation, the first kneading tool comprises a dough hook disposed on the stirring spindle and the second kneading tool comprises a dough mixer disposed on the kneading spindle;
    the kneading spindle comprises a lower kneading spindle, an upper kneading spindle and a connector configured from bottom to top of the kneading spindle;
    an outer side of the upper kneading spindle is mounted with a kneading arm whose free end is connected to the dough mixer;
    the food kneading appliance is characterized in that:
    the lower kneading spindle has an end connected to the stirring spindle and another end connected to the connector via a through hole defined in a center part of the upper kneading spindle; and
    the connector is locked to a holder which is fixedly connected to a cover of the container.

2. The food kneading appliance for kneading a dough of claim 1, wherein the kneading spindle is located on an upper portion of the stirring spindle.

3. The food kneading appliance for kneading a dough of claim 1, wherein the drive unit comprises at least a drive shaft for driving the stirring spindle; a driving bevel gear is located on an upper inner side of the stirring spindle; the upper kneading spindle has a following bevel gear located inside a lower portion thereof and the lower kneading spindle Is provided with several gear brackets; several planet bevel gears are received in the gear brackets respectively and rotatable freely in the gear brackets; the driving bevel gear drives the following bevel gear to rotate in opposite directions via the planet bevel gears.

4. The food kneading appliance for kneading a dough of claim 3, wherein a hollow cylindrical object with both ends open is projected out from a center of a bottom part of the container; the central body is detachably mounted on an outside of the cylindrical object, the drive shaft connects to the central body though a center of the cylindrical object.

5. The food kneading appliance for kneading a dough of claim 4, wherein the cover of the container comprises a feeding passage.

6. The food kneading appliance for kneading a dough of claim 4, wherein the cylindrical object and the container are molded in one.

7. The food kneading appliance for kneading a dough of claim 1, wherein the dough hook has a substantially J shape, one end of the dough hook extends downwardly from a lower side of the stirring spindle, and then extends upwardly after bending angularly; the kneading arm mounted on the outer side of the upper kneading spindle has a substantially inverted L shape; the dough mixer connected to the free end of the kneading arm is formed as a paddle shape.

8. The food kneading appliance for kneading a dough of claim 1, wherein the dough hook protrudes substantially horizontally from a lower part of the stirring spindle and extends upwardly after bending angularly, the dough mixer configured outside of the upper kneading spindle is substantially formed as L shape.

* * * * *